UNITED STATES PATENT OFFICE.

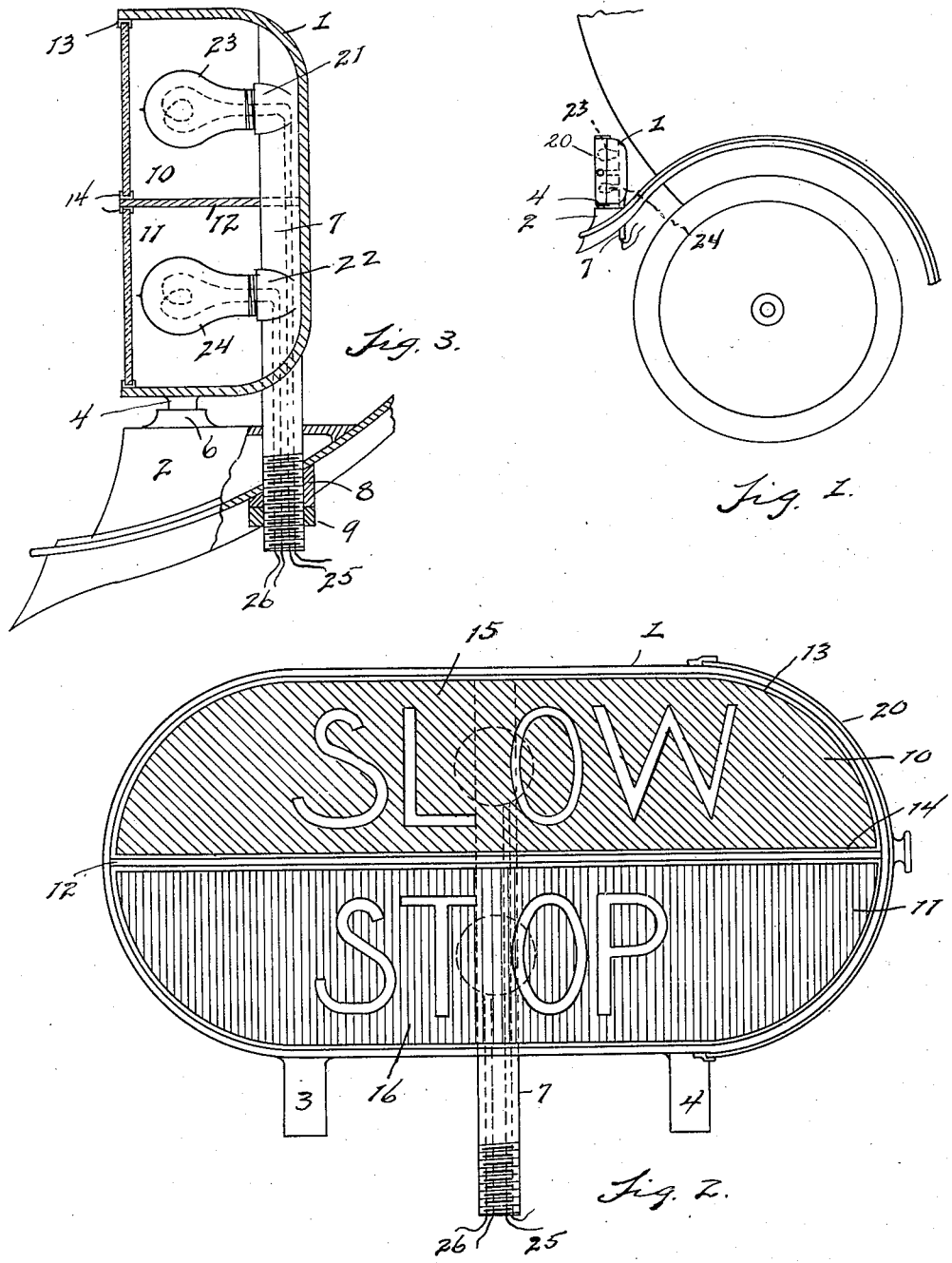

STEPHEN F. SAXTON, OF DETROIT, MICHIGAN, ASSIGNOR OF ONE-HALF TO JAMES A. MILLER, OF TOLEDO, OHIO.

AUTOMOBILE-SIGNAL.

1,217,223.  Specification of Letters Patent.  Patented Feb. 27, 1917.

Application filed February 8, 1915. Serial No. 6,891.

*To all whom it may concern:*

Be it known that I, STEPHEN F. SAXTON, a citizen of the United States, residing at Detroit, county of Wayne, State of Michigan, have invented a certain new and useful Improvement in Automobile-Signals, and declare the following to be a full, clear, and exact description of the same, such as will enable others skilled in the art to which it pertains to make and use the same, reference being had to the accompanying drawings, which form a part of this specification.

This invention relates to traffic signals for automobiles or other vehicles and its object is a cheap and efficient device by means of which the driver of a vehicle may signal a following vehicle and advise the driver thereof as to the action about to be taken by the forward vehicle.

The device is intended to be applied to the mud-guard on automobiles, and a further object of the invention is involved in the means for supporting the signal and in the means provided to receive the circuits for the electric lamps utilized therewith. These objects and the various novel features of construction of the device are hereinafter more fully described and claimed and shown in the accompanying drawings in which—

Figure 1 is a side elevation of my improved traffic signal in position on the mud-guard of the vehicle.

Fig. 2 is an enlarged front elevation of the signal.

Fig. 3 is a vertical section taken substantially on line $x$—$x$ of Fig. 2.

Similar characters refer to similar parts throughout the drawing and specification.

As shown more particularly in Figs. 2 and 3, the device consists of a casing 1 and a base member 2 for the support thereof. The casing may be of any approved form and is preferably provided with lugs 3 and 4 at the bottom adapted to engage in like sockets 6 provided in the base member which is adapted to be secured to the mud-guard. The base member and mud-guard are also apertured to receive the projecting end of a metal tube 7, the lower end of which is threaded and provided with an angle washer 8 and a nut 9 by means of which the casing 1, to which the tube is attached, may be securely held in position on the base member.

The casing 1 is provided with two compartments 10 and 11 by means of the central dividing wall 12. Both these compartments are open on one side and when in position on the vehicle, face the rear. The forward edge of the case and the dividing wall are provided with light metal channels 13 and 14 adapted to receive a glass 15 or 16 for either compartment. The glass in the upper compartment may have any approved inscription formed therein, as for instance, the word "Slow" and the lower glass may likewise be provided with the word "Stop." In practice I prefer to have the upper glass green and the lower glass red while the inscriptions are uncolored. The word "Stop" appears on the red glass as the color thereof is a danger signal and is employed only when it is desired to have the following vehicle stop. The casing is preferably provided with a slide 20 at one end thereof for closing the aperture through which the glass may be inserted in place in the channels and by opening the slide the glass may be removed and access given to the interior of the casing as may be necessary in changing electric light bulbs or other purpose.

The tube 7 is secured substantially centrally of the case 1 at the rear thereof as indicated in Figs. 2 and 3, and this tube is provided with sockets 21 and 22 extending into each compartment respectively adapted to receive the electric light bulbs 23 and 24. The tube provides a conduit for the electrical circuits 25 and 26 for each lamp respectively, and a switch, (not shown) but preferably of the push button type, is provided within convenient reach of the driver so that either signal may be displayed at will.

In operation if the driver of the vehicle sees that preceding traffic is slowing down he may close the circuit to the light in the upper compartment indicating to a following vehicle to slow down or if the driver desires to come to a stop he displays the corresponding signal and in case neither signal is displayed the driver would thus indicate his intention to proceed.

Having thus briefly described my invention and its utility, what I claim and desire to secure by Letters Patent of the United States is—

In a device of the character described, a casing having separate compartments, a tube extending into the casing through every compartment and having a threaded portion projecting exteriorly of the casing, said casing having a lug, a base member formed to fit the fender of the vehicle provided with a socket for the said lug, the base being apertured to receive the projecting end of the tube, and a nut on said threaded end of the tube for holding the parts in assembled relation.

In testimony whereof, I sign this specification in the presence of two witnesses.

STEPHEN F. SAXTON.

Witnesses:
EMENS B. WISNER,
CHARLES E. WISNER.